(12) United States Patent
Wang et al.

(10) Patent No.: US 10,271,364 B2
(45) Date of Patent: Apr. 23, 2019

(54) D2D COMMUNICATION METHOD, D2D-ENABLED DEVICE AND ENODE B

(71) Applicant: Panasonic Intellectual Property Corporation of America, Torrance, CA (US)

(72) Inventors: Lilei Wang, Beijing (CN); Hidetoshi Suzuki, Kanagawa (JP); Joachim Loehr, Hessen (DE); Masayuki Hoshino, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 166 days.

(21) Appl. No.: 15/190,192

(22) Filed: Jun. 23, 2016

(65) Prior Publication Data

US 2016/0302252 A1 Oct. 13, 2016

Related U.S. Application Data

(63) Continuation of application No. PCT/CN2014/074357, filed on Mar. 31, 2014.

(51) Int. Cl.
| | |
|---|---|
| *H04W 76/14* | (2018.01) |
| *H04W 76/27* | (2018.01) |
| *H04W 28/18* | (2009.01) |
| *H04W 72/12* | (2009.01) |
| *H04W 8/00* | (2009.01) |

(Continued)

(52) U.S. Cl.
CPC ........... *H04W 76/14* (2018.02); *H04L 1/0025* (2013.01); *H04L 1/0031* (2013.01); *H04W 8/005* (2013.01); *H04W 28/18* (2013.01); *H04W 72/1231* (2013.01); *H04W 76/27* (2018.02); *H04W 88/08* (2013.01)

(58) Field of Classification Search
CPC .... H04L 1/0025; H04L 1/0031; H04W 28/18; H04W 72/1231; H04W 76/023; H04W 76/046; H04W 88/08; H04W 8/005
USPC .......................................................... 370/329
See application file for complete search history.

(56) References Cited

U.S. PATENT DOCUMENTS

| 9,398,630 B2* | 7/2016 | Zou ...................... H04W 76/023 |
| 2005/0208973 A1* | 9/2005 | Iochi ..................... H04L 1/0026 |
| | | 455/561 |

(Continued)

OTHER PUBLICATIONS

Samsung, "Mode 1 resource allocation for D2D broadcast communication", R1-141307, 3GPP TSG RAN WG1 Meeting #76bis, Agenda item: 7.2.7.2.2, Shenzen, P.R. China, Mar. 31-Apr. 4, 2014, 5 pages.

(Continued)

*Primary Examiner* — Stephen J Clawson
(74) *Attorney, Agent, or Firm* — Seed IP Law Group LLP

(57) ABSTRACT

Provided are D2D communication methods, a D2D-enabled device and an eNB. A D2D communication method performed by a D2D-enabled device comprises: reporting, through a media access control (MAC) signaling or a radio resource control (RRC) signaling to an eNode B (eNB) that allocates resource for a D2D transmission, a modulation and coding scheme (MCS) or a resource size to be used by the D2D-enabled device in the D2D transmission, wherein the MCS or the resource size is for a D2D data channel, a D2D control channel and/or a D2D discovery channel.

15 Claims, 10 Drawing Sheets

(51) Int. Cl.
*H04L 1/00* (2006.01)
*H04W 88/08* (2009.01)

(56) References Cited

U.S. PATENT DOCUMENTS

| | | | |
|---|---|---|---|
| 2007/0133402 A1* | 6/2007 | Lee | H04W 28/20 370/229 |
| 2008/0069053 A1* | 3/2008 | Kim | H04W 36/02 370/332 |
| 2011/0223924 A1 | 9/2011 | Lohr et al. | |
| 2011/0268006 A1* | 11/2011 | Koskela | H04W 4/70 370/312 |
| 2013/0028212 A1 | 1/2013 | Lohr et al. | |
| 2013/0089020 A1* | 4/2013 | Hakola | H04L 1/1867 370/312 |
| 2013/0150061 A1 | 6/2013 | Shin et al. | |
| 2013/0184024 A1* | 7/2013 | Chen | H04W 76/14 455/509 |
| 2014/0177449 A1* | 6/2014 | Novak | H04W 4/008 370/241 |
| 2016/0057761 A1* | 2/2016 | Panaitopol | H04W 72/085 370/329 |

OTHER PUBLICATIONS

International Search Report of PCT application No. PCT/CN2014/074357 dated Jan. 6, 2015.

* cited by examiner

300

Reporting a recommended MCS or a recommended resource size to be used by the D2D-enabled wireless device in a D2D transmission through a MAC signaling or a RRC signaling to an eNB that allocates resource for the D2D transmission — 301

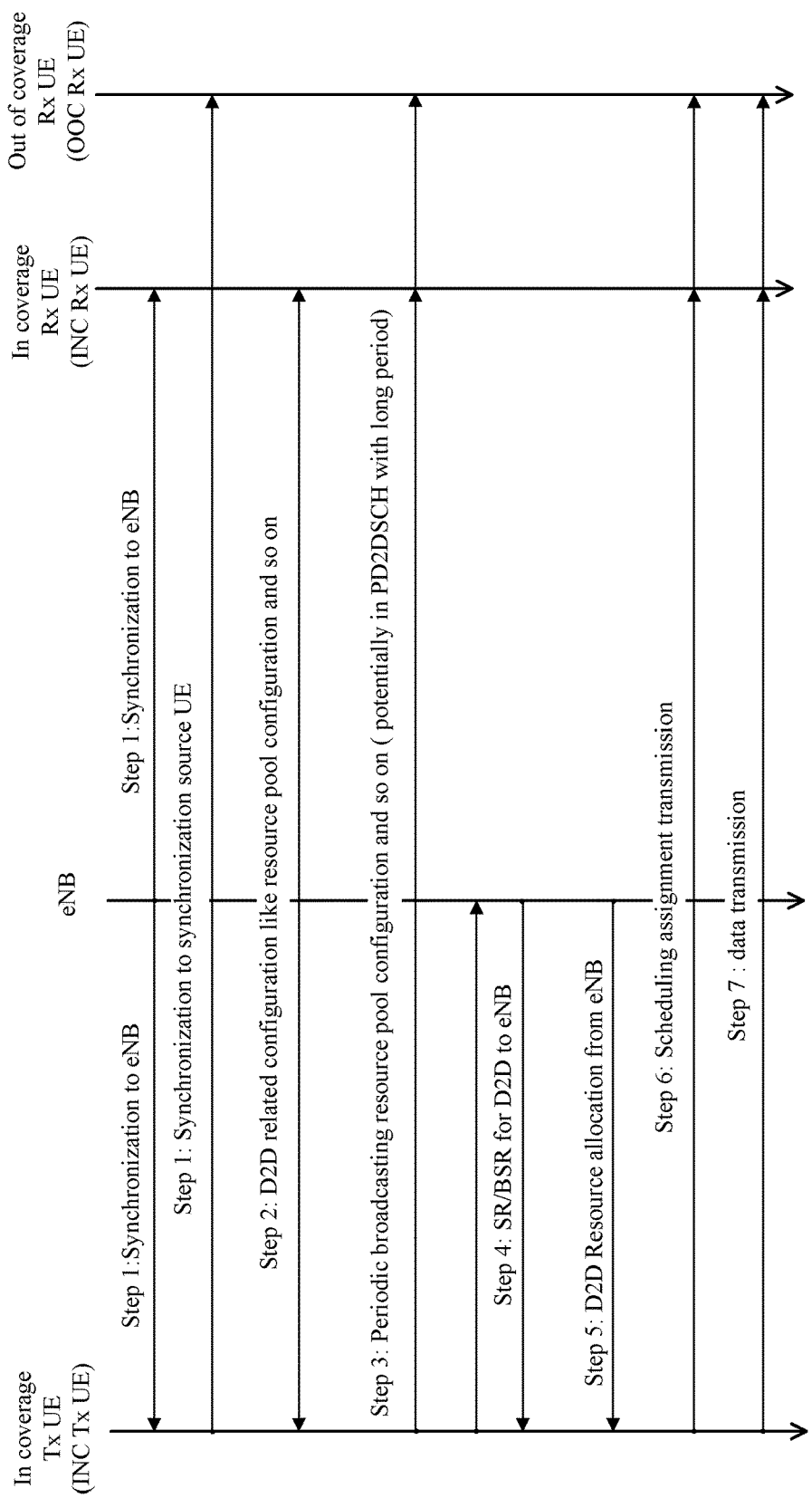

600

Receiving a recommended MCS or a recommended resource size to be used by the D2D-enabled wireless device in the D2D transmission from the D2D-enabled wireless device through a MAC signaling or a RRC signaling  601

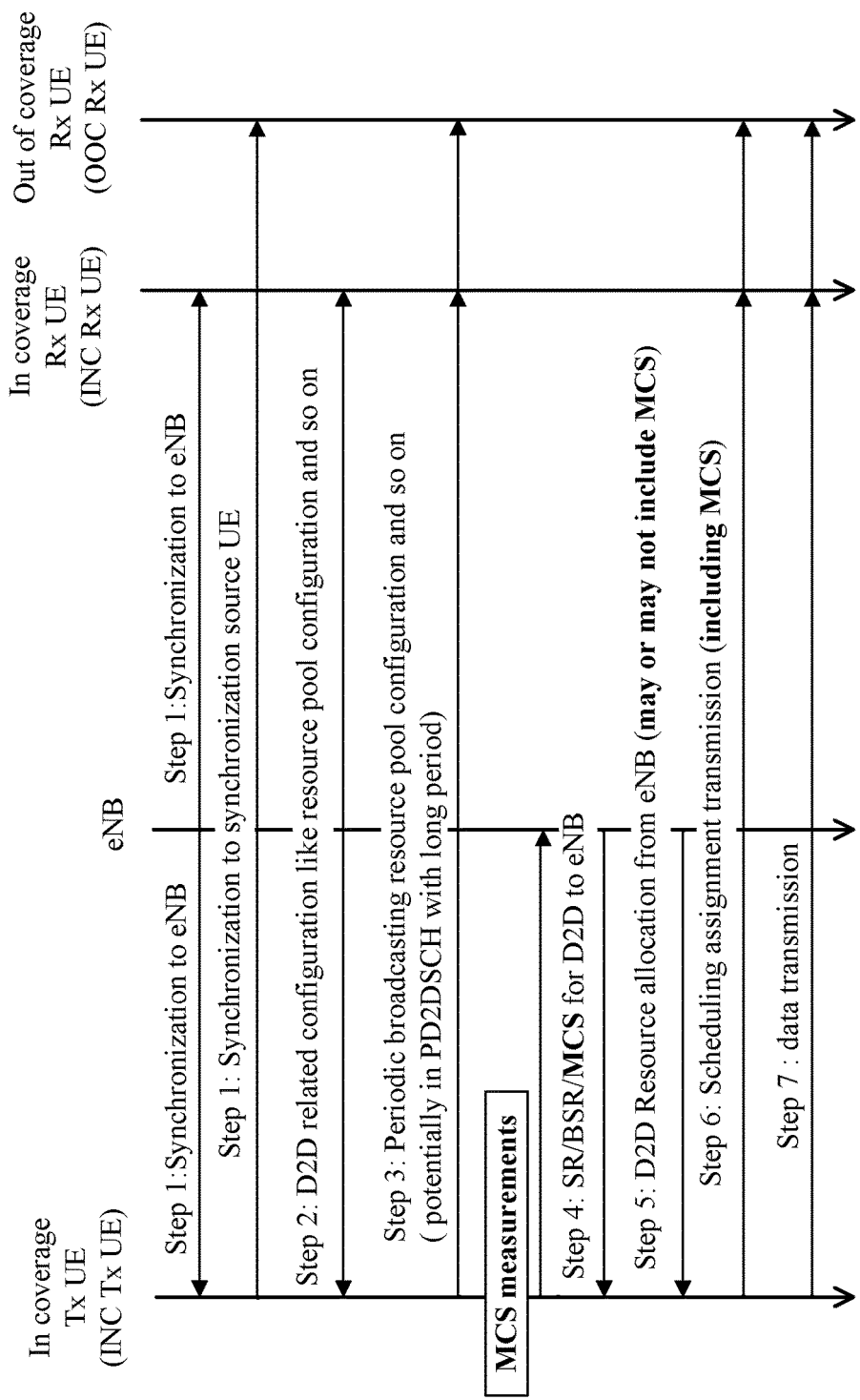

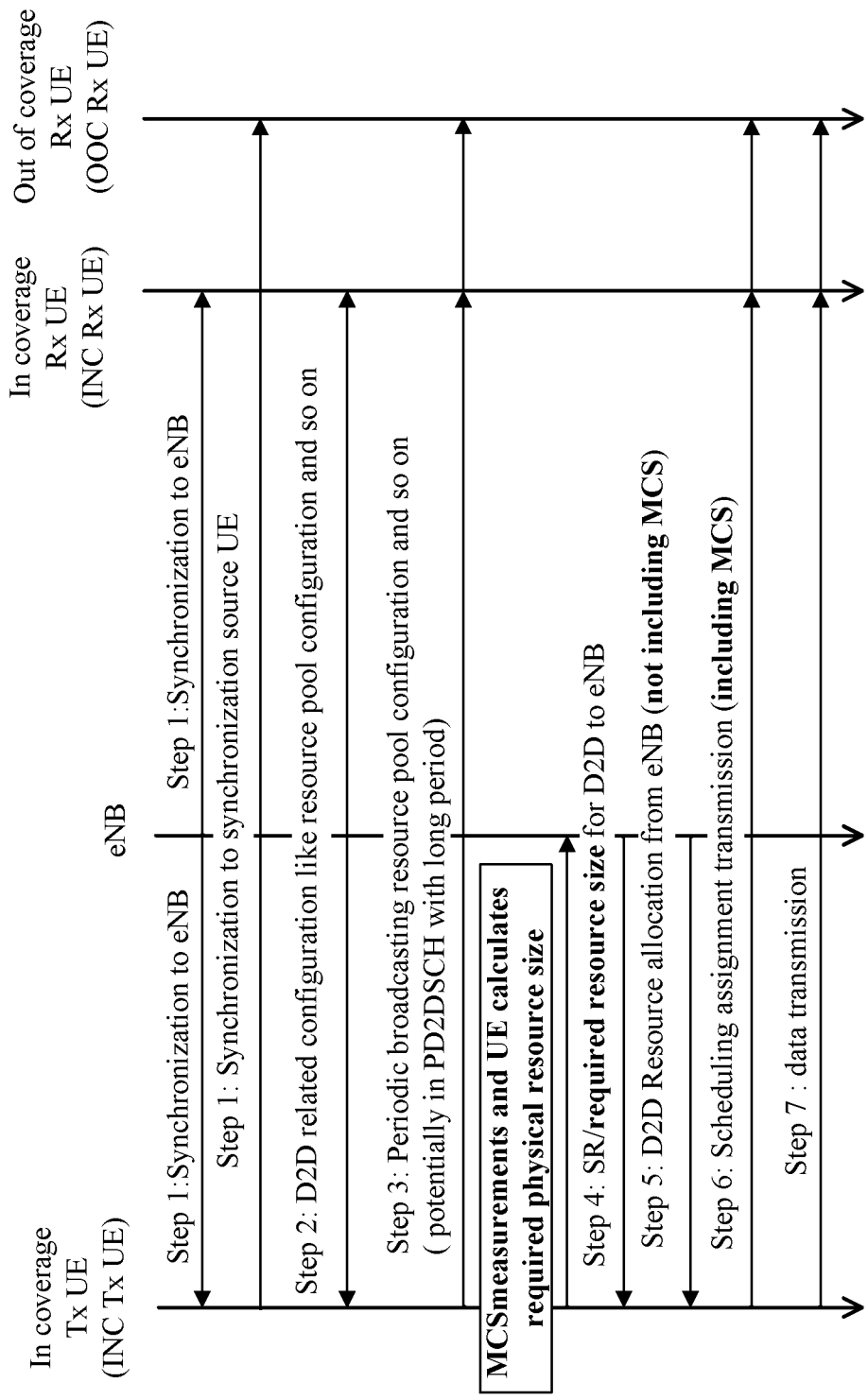

D2D COMMUNICATION METHOD, D2D-ENABLED DEVICE AND ENODE B

BACKGROUND

1. Technical Field

The present disclosure relates to the field of device to device (D2D) communication, and in particular, to D2D communication methods, a D2D-enabled device and an eNode B (eNB).

2. Description of the Related Art

Device-to-device (D2D) communication is direct communication between devices and is a new topic in 3GPP (3rd Generation Partnership Project) LTE (Long Term Evolution) Release 12. D2D communication could happen with wireless network coverage (e.g. for commercial case) or without network coverage (e.g. for public safety). FIG. 1 illustrates exemplary D2D communications with and without wireless network coverage. On the left side of FIG. 1, UE 101 and UE 102 are within the wireless network coverage of eNB 103, but they are communicating with each other directly (i.e. not through eNB 103) and eNB 103 is used for synchronization, resource scheduling or the like. On the right side of FIG. 1, UE 104 and UE 105 are not within any wireless network coverage, and they are communicating with each other directly.

3GPP RAN1#76 meeting agreed eNB scheduling based resource allocation (Mode 1) as baseline method in network-coverage (INC) scenario and UE selection on its own based resource allocation (Mode 2) is baseline method in edge-of-coverage or out-of coverage (OOC) scenario.

SUMMARY

The present disclosure is made in view of the above in order to propose a reporting scheme for a modulation and coding scheme (MCS) or resource size to be used by a D2D-enable device in the D2D communication.

In a first aspect of the present disclosure, there is provided a device-to-device (D2D) communication method performed by a D2D-enabled device, comprising: reporting, through a media access control (MAC) signaling or a radio resource control (RRC) signaling to an eNode B (eNB) that allocates resource for a D2D transmission, a modulation and coding scheme (MCS) or a resource size to be used by the D2D-enabled device in the D2D transmission, the MCS or the resource size being for a D2D data channel, a D2D control channel and/or a D2D discovery channel; and receiving, from the eNB, information on the allocated resource.

In a second aspect of the present disclosure, there is provided a device-to-device (D2D) communication method performed by an eNode B (eNB) for allocating resource for a D2D transmission to be performed by a D2D-enabled device, comprising: receiving, from the D2D-enabled device through a media access control (MAC) signaling or a radio resource control (RRC) signaling, a modulation and coding scheme (MCS) or a resource size to be used by the D2D-enabled device in the D2D transmission, the MCS or the resource size being for a D2D data channel, a D2D control channel and/or a D2D discovery channel; and transmitting, to the D2D-enabled device, information on the allocated resource.

In a third aspect of the present disclosure, there is provided a device-to-device (D2D)-enabled device, comprising: a transmitter, which, in operation, transmits, through a media access control (MAC) signaling or a radio resource control (RRC) signaling to an eNode B (eNB) that allocates resource for a D2D transmission, a modulation and coding scheme (MCS) or a resource size to be used by the D2D-enabled device in the D2D transmission, the MCS or the resource size being for a D2D data channel, a D2D control channel and/or a D2D discovery channel: and a receiver, which, in operation, receives, from the eNB, information on the allocated resource.

In a fourth aspect of the present disclosure, there is provided an eNode B (eNB) for allocating resource for a device-to-device (D2D) transmission to be performed by a D2D-enabled device, comprising: a receiver, which, in operation, receives, from the D2D-enabled device through a media access control (MAC) signaling or a radio resource control (RRC) signaling, a modulation and coding scheme (MCS) or a resource size to be used by the D2D-enabled device in the D2D transmission, the MCS or the resource size being for a D2D data channel, a D2D control channel and/or a D2D discovery channel; and a transmitter, which, in operation, transmits, to the D2D-enabled device, information on the allocated resource.

The foregoing is a summary and thus contains, by necessity, simplifications, generalization, and omissions of details. Other aspects, features, and advantages of the devices and/or processes and/or other subject matters described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 2 illustrates an exemplary resource allocation procedure by an eNB in a D2D communication;

FIG. 8A and FIG. 8B schematically illustrate another exemplary resource allocation procedure employing a D2D communication method according to an embodiment of the present disclosure, based on the exemplary resource allocation procedure shown in FIG. 2;

FIG. 9A and FIG. 9B schematically illustrate another exemplary resource allocation procedure employing a D2D communication method according to an embodiment of the present disclosure, based on the exemplary resource allocation procedure shown in FIG. 2;

DETAILED DESCRIPTION

Figures 1, 3:
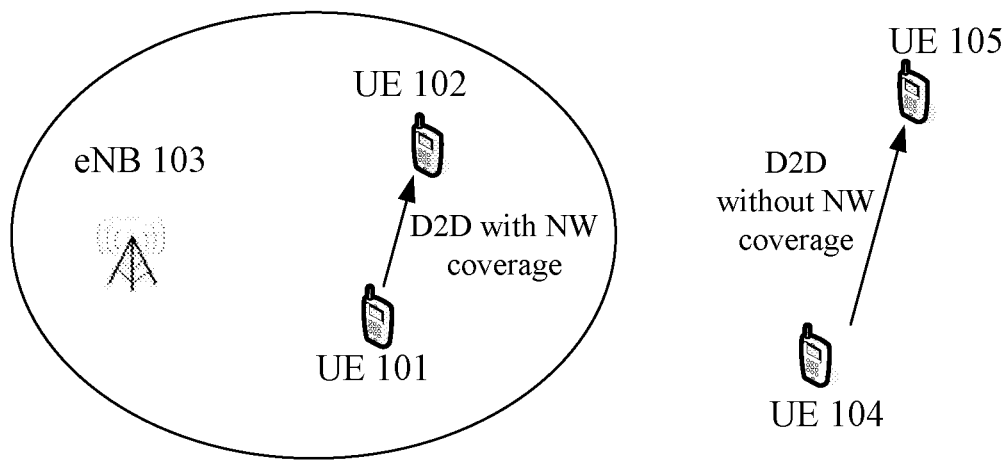
FIG. 1 illustrates exemplary D2D communications with and without wireless network coverage.
FIG. 3 illustrates a flowchart of a D2D communication method performed by a D2D-enabled wireless device according to an embodiment of the present disclosure.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

It is noted that some descriptions may be made based on user equipments (UEs) in the specification; however, the D2D-enabled wireless devices in the present disclosure are not limited to UEs but can be for example notebooks, pads, sensors or other devices with D2D wireless communication capability.

For D2D communications in INC scenario, an eNB is used to allocate (schedule) resource for a D2D transmission. Therefore, the D2D-enabled wireless device which intends to perform a D2D transmission may need to report some information such as buffer status report (BSR) to the eNB for the eNB to determine the resource size required for the D2D transmission.

FIG. 2 illustrates an exemplary resource allocation procedure by an eNB in a D2D communication. Basically seven steps are involved.

Step 1) All UEs in-network-coverage (INC) synchronize with eNB, and Out-of-coverage (OOC) UE nearby to an INC UE synchronizes with the INC UE.

Step 2) INC UEs receive D2D configuration information (resource pool configuration, PRACH channel and so on) from eNB.

Step 3) The synchronization source D2D UE (shown as INC transmitting UE in the figure) periodically broadcasts resource pool configuration and so on (potentially in PD2DSCH with a long period like 200 ms to a few seconds).

Step 4) INC transmitting UE triggers D2D scheduling request and buffer status report (BSR) to eNB.

Step 5) eNB allocates (schedules) resource for D2D communication for requested D2D scheduling request, and transmits, to the INC transmitting UE, information on the allocated resource.

Step 6) When INC transmitting UE receives information on the allocated resource from eNB, the UE sends scheduling assignment in scheduling assignment pool.

Step 7) INC transmitting UE sends data in data resource pool. Both INC and OOC receiving UE detect the scheduling assignment and receive data accordingly.

Here, basically the assumption on MCS of D2D communication is fixed, for example QPSK. Then in step 4) UE only reports BSR which is enough for the eNB to calculate needed D2D resource size. On the other hand, a dynamic MCS is very useful for D2D to do efficient transmission by adapting to channel variation. Then it is useful for D2D-enabled UE to report D2D MCS to eNB. Otherwise, eNB is difficult to do accurate resource allocation. For example, assuming that 16 QAM is appropriate for D2D transmission and 10 PRBs are needed, if eNB does not know such a situation and still uses QPSK to calculate needed PRB size, then it will allocate 20 PRBs, which would largely waste the resource.

Therefore, the MCS may also need to be reported to the eNB in order for the eNB to calculate the needed D2D resource size. So far there is no mechanism in LTE WAN to support D2D-enabled UEs to report a MCS of D2D channel to the eNB. One solution is that D2D-enabled UE re-uses CQI report mechanism in L1. However, such a mechanism will have large specification impact. For example, new report mode and timing are needed. And, to report CQI in L1 uplink may impact LTE WAN UE's feedback so that LTE WAN's performance would be degraded. Therefore, in the present disclosure, a novel MCS reporting mechanism is provided. Alternatively, the UE may directly report resource size to be used in D2D transmission to eNB for the eNB to perform resource allocation. Then eNB does not need to know MCS information. Accordingly, the present disclosure also provides a resource size reporting mechanism.

FIG. 3 illustrates a flowchart of a D2D communication method performed by a D2D-enabled wireless device according to an embodiment of the present disclosure. The method 300 comprises a step 301 of reporting a MCS or a resource size to be used by the D2D-enabled wireless device in a D2D transmission through a MAC signaling or a RRC signaling to an eNB that allocates (schedules) resource for the D2D transmission, wherein the reported MCS or the reported resource size is for a D2D data channel, a D2D control channel and/or a D2D discovery channel. According to the embodiment of the present disclosure, the MCS or the resource size to be used by the D2D-enabled wireless device in the D2D transmission will be reported through MAC signaling (e.g. in a MAC CE) or RRC signaling. Therefore, eNB could perform finer resource allocation for D2D transmission. In the present disclosure, the MCS or the resource size to be used by the D2D-enabled wireless device in the D2D transmission are referred to as "a recommended MCS" or a "recommended resource size", hereinafter.

Figure 4:
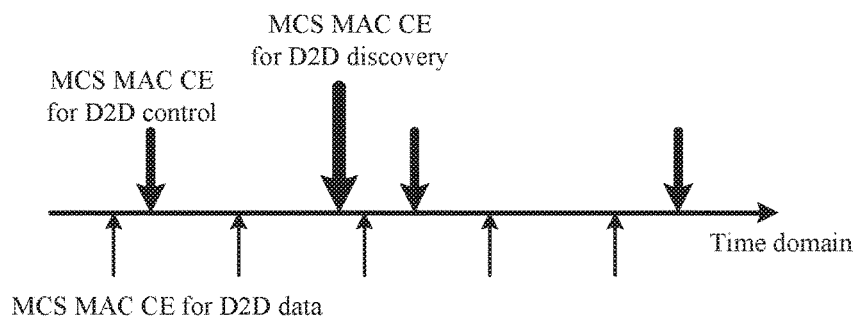
FIG. 4 schematically illustrates exemplary different reporting manners for the data channel, the control channel and the discovery channel.

In D2D communication, there can be for example a D2D data channel, a D2D control channel and a D2D discovery channel. According to the present disclosure, the recommended MCS or the recommended resource size can be for a D2D data channel, a D2D control channel and/or a D2D discovery channel. In other words, the reported recommended MCS or resource size can represent the channel condition of the D2D data channel, the D2D control channel and/or the D2D discovery channel. In particular, the recommended MCS or the recommended resource size for each channel can be reported in a separate MAC CE, or the recommended MCSs or the recommended resource sizes for multiple channels can be reported in a same MAC CE. In addition, each channel's property can be different. For example, the discovery channel is relatively slowly transmitted with periodicity of several seconds but data may be transmitted with tens of milliseconds. Therefore, the recommended MCSs or the recommended resource sizes for at least two different channels can be reported differently. For example, the MCS for D2D data and the MCS for D2D control can be reported with MAC signaling (e.g. in a MAC CE) but the MCS for discovery channel can be reported with RRC signaling. In other words, the recommended MCS or the recommended resource size for a first channel can be reported through a MAC signaling, and the recommended MCS or the recommended resource size for a second channel different from the first channel can be reported through a RRC signaling. In addition, since the discovery channel may have longer periodicity, its relevant MCS or resource size can be reported and triggered more slowly than that of data channel and control channel. FIG. 4 schematically illustrates exemplary different reporting manners for the data channel, the control channel and the discovery channel. As shown in FIG. 4, the MCS for D2D data channel is transmitted most frequently, the MCS for D2D control channel is transmitted second most frequently, and the MCS for D2D discovery channel is transmitted least frequently. Here, the MCS for D2D data channel and the MCS for D2D control channel may be reported in MAC CEs, and the MCS for D2D discovery may be reported through RRC signaling.

In addition, as described in the above, when reporting the recommended MCS, a buffer status report (BSR) can also be reported from the D2D-enabled wireless device to the eNB in order for the eNB to calculate the needed resource size. The MCS can be reported with the BSR simultaneously. For example, the recommended MCS can be reported in a same MAC control element (CE) with the BSR. In this case, it take advantage of reusing existing signaling. However, the recommended MCS can also be reported in a different MAC CE from the BSR.

On the other hand, when reporting the recommended resource size, no BSR may need to be reported from the D2D-enabled wireless device to the eNB because the eNB does not need the BSR to calculate needed resource size but can determine a resource size according to the received recommended resource size. However, BSR can also be reported for other purpose. In the present disclosure, the recommended resource size can be for example the total number of PRB pairs (PRB number in frequency domain in each subframe multiplies the number of subframes).

Further, in the present disclosure, the reporting of MCS or recommended resource size can only use one format of MAC CE, i.e. without distinction of short or long format of MAC CE. However, a concept of Logical channel group (LCG) can also be adopted for D2D according to the present disclosure. In this case, the short or long format can be reused for the MCS MAC CE or the resource size MAC CE, and a reserved or new logical channel ID (LCG ID) can be used for short MCS format. In addition, the priority of MAC CE for D2D MCS or recommended resource size can follow MAC CE for D2D BSR. For example, the priority of MCS and BSR MAC CEs can be lower than LTE MAC CEs or higher than some of LTE MAC CEs depending on traffic type or report type.

In the present disclosure, preferably the triggering of the reporting of the recommended MCS can be the same as the triggering of the reporting of the BSR which refers to corresponding standards defined in LTE. Alternatively, the reporting of the recommended MCS or the reporting of both the recommended MCS and the BSR can be triggered by change in channel condition. For example, when the recommended D2D MCS changes due to changes in the channel by some predefined threshold, the UE will report a D2D MCS or both D2D MCS and BSR to eNB which could in turn update the D2D resource allocation. Similarly, the triggering of the reporting of the recommended resource size can also be based on the conditions for triggering BSR in LTE standards or change in channel condition.

Further, in order for the D2D-enabled wireless device to obtain the recommended MCS, the D2D-enabled wireless device can determine the MCS based on certain measurement results e.g., averaged RSRP of D2DSS/PD2DSCH of potential receiving D2D-enabled UEs or RSRP of D2DSS/PD2DSCH of synchronization head. Accordingly, for the recommended resource size, the D2D-enabled wireless device can calculate the resource size (e.g. the total number of PRB pairs) based on the number of bits to be transmitted and the MCS determined by the D2D-enabled wireless device.

Figure 5A:
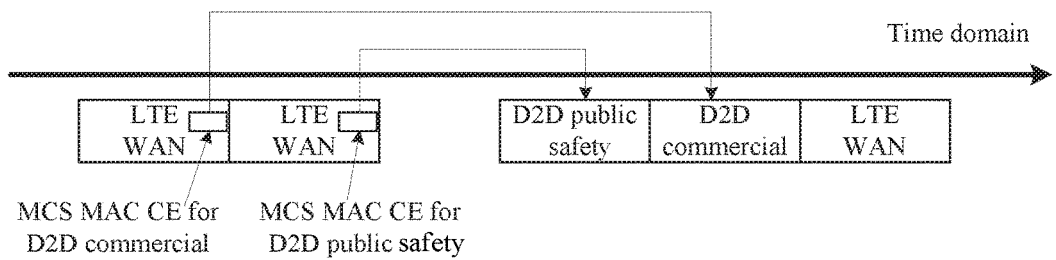
FIG. 5A and FIG. 5B schematically illustrate exemplary MCS reporting manners for the public safety scenario and the commercial scenario.
Figure 5B:
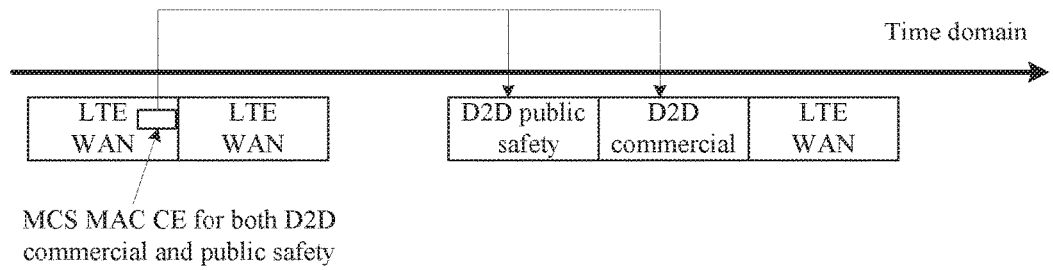

In addition, D2D communication may support more than one application scenarios such as public safety and commercial case. For different application scenarios, different or same MAC signaling or RRC signaling can be used to report the recommended MCSs or the recommended resource sizes. For example, the recommended MCSs or the recommended resource sizes for different application scenarios can be reported in separate MAC CEs, or in a same MAC CE. FIG. 5A and FIG. 5B schematically illustrate exemplary MCS reporting manners for the public safety scenario and the commercial scenario. As shown in FIG. 5A, one MCS MAC CE is used for D2D commercial case and another MCS MAC CE is used for D2D public safety case. The two MCS MAC CEs are relatively independent and can be reported in different subframes. In this case, the D2D MCS reports of public safety case and D2D commercial case may also use a same format of MAC CE, and the interpretation on which case the MAC CE is intended for can depend on the subframe number transmitting the MAC CE or depend on some conditions (for example, if UEs receive public safety related DCI to schedule PUSCH, then the relevant MCS report in PUSCH is certainly for public safety). On the other hand, as shown in FIG. 5B, one common MCS MAC CE can be used to reflect both D2D commercial case and D2D public safety case.

Figures 6, 7:
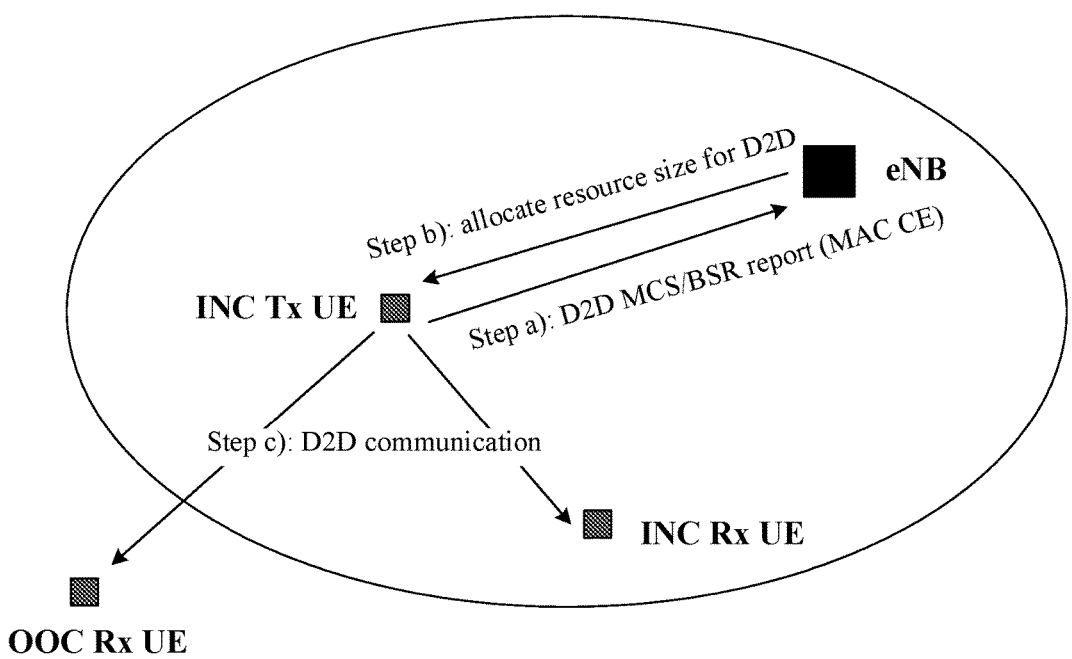
FIG. 6 illustrates a flowchart of a D2D communication method performed by an eNB according to another embodiment of the present disclosure.
FIG. 7 schematically illustrates an exemplary resource allocation procedure employing a D2D communication method according to an embodiment of the present disclosure.

According to the present disclosure, at the side of the eNB involved in the D2D communication, a D2D communication method 600 performed by the eNB for allocating (scheduling) resource for a D2D transmission to be performed by a D2D-enabled wireless device is provided, as shown in FIG. 6. The method 600 comprises a step 601 of receiving, from the D2D-enabled wireless device through a MAC signaling or a RRC signaling, a recommended MCS or a recommended resource size to be used by the D2D-enabled wireless device in the D2D transmission, wherein the recommended MCS or the recommended resource size is for a D2D data channel, a D2D control channel and/or a D2D discovery channel.

It is noted that the above proposals for MCS reporting can also be used for power headroom report (PHR) reporting on D2D. For example, different PHR MAC CEs are used for control, data and discovery channels respectively, or a same MAC CE reports all the channels.

In the following, several specific examples of applying the D2D communication methods according to embodiments of the present disclosure to the resource allocation procedure in D2D communications are described in detail. It is noted that these examples are only used for the purpose of illustration, but by no means to limit the scope of the present disclosure.

In a first example, as shown in FIG. 7 which schematically illustrates an exemplary resource allocation procedure employing a D2D communication method according to an embodiment of the present disclosure, basically three steps are involved. At step a), the INC Tx (transmitting) UE reports (transmits) BSR/MCS MAC CE(s) to the eNB. At step b), the eNB calculates needed D2D resource size, allocates such a resource to the D2D Tx UE, and transmits information on the allocated resource to the D2D Tx UE, which is then received by the the D2D Tx UE. At step c), the D2D Tx UE does D2D broadcasting with the resource size obtained from step b). The broadcasted resource size can be received by an INC Rx (receiving) UE and an OOC Rx UE.

Figure 8B:
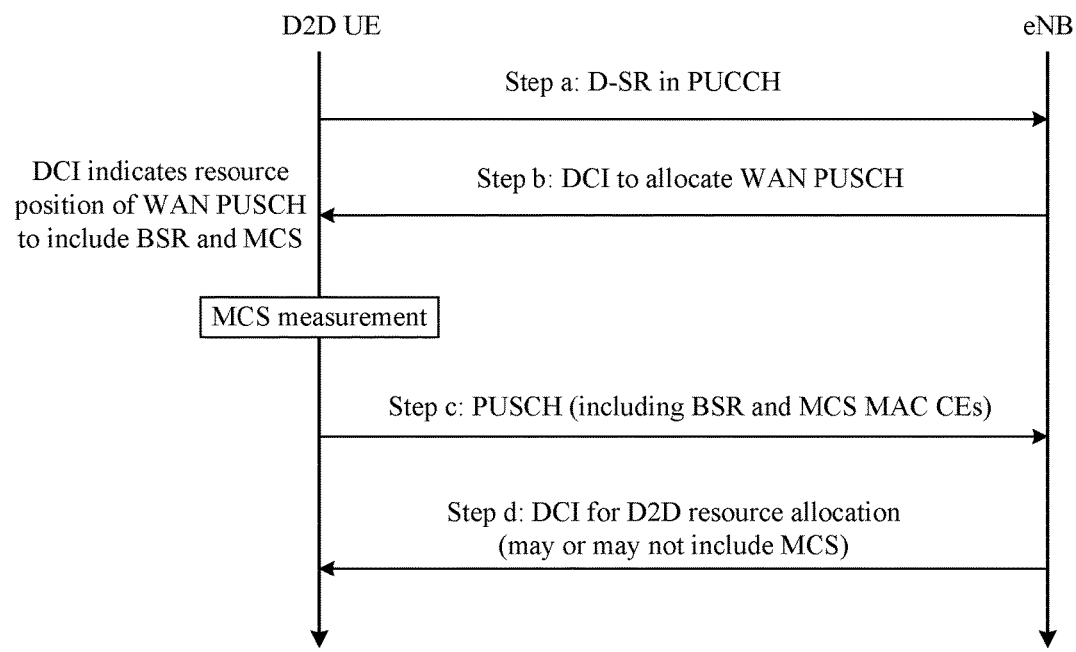

FIG. 8A and FIG. 8B schematically illustrate a second example of resource allocation procedure employing a D2D communication method according to an embodiment of the present disclosure, based on the exemplary resource allocation procedure shown in FIG. 2. As shown in FIG. 8A which is a general introduction to the resource allocation procedure, the difference between FIG. 8A and FIG. 2 is that MCS will be reported as well as BSR from the transmitting D2D-enabled UE (INC Tx UE) to the eNB (as shown in step 4). Accordingly, the transmitting D2D-enabed UE will carry out MCS measurements before reporting the MCS, for example based on averaged RSRP of D2DSS of potential receiving D2D-enabled UEs. The eNB will calculate needed D2D resource size based on the MCS/BSR report from step 4 and send the D2D resource allocation information in step 5. Such information may or may not include MCS. If no MCS is included in step 5, it means that the eNB uses the MCS recommended by UE to calculate the resource size. An explicitly included MCS by the eNB in step 5 could be regarded as a confirmation of MCS usage for the D2D-enabled UE. In some cases, the eNB could also override MCS reported from the D2D-enabed UE depending on the resource situation. After step 5, D2D-enabed UEs will carry out D2D communication in step 6 and 7. Importantly, in step 6, the scheduling assignment transmitted by the transmitting D2D-enabled UE can include MCS information to support dynamic MCS transmission.

In the second example, the detailed signaling interaction between the transmitting D2D enabled UE and the eNB in steps 4 and 5 in FIG. 8A can refer to FIG. 8B. As shown in FIG. 8B, basically, the UE will send dedicated scheduling request (D-SR) in PUCCH to the eNB (step a), and then the eNB will allocate DCI in LTE WAN (E)PDCCH to allocate LTE WAN PUSCH resource (step b). Based on certain MCS measurement (for example, based on averaged RSRP of D2DSS of all potential receiving D2D enabled UEs), the UE will report BSR and MCS MAC CEs simultaneously in allocated PUSCH (step c). After that, the eNB will transmit DCI for D2D resource allocation.

Figure 9B:
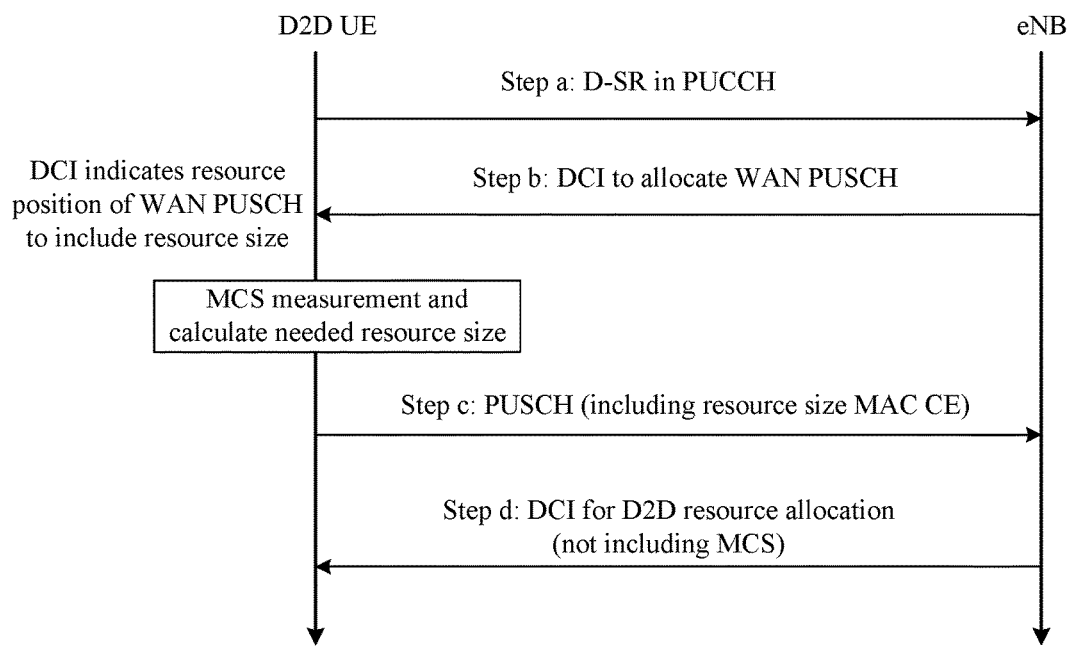

FIG. 9A and FIG. 9B schematically illustrate a third example of resource allocation procedure employing a D2D communication method according to an embodiment of the present disclosure, based on the exemplary resource allocation procedure shown in FIG. 2. The third example is similar to the second example. The difference consists only in that the transmitting D2D-enabed UE in the third example will calculate needed resource size based on its own traffic situation and MCS measurements and report recommended resource size (in term of MAC CE) instead of BSR and MCS MAC CE(s) to the eNB accordingly in step 4. The detailed behaviors for steps 4 and 5 in FIG. 9A can refer to FIG. 9B. The only difference between FIG. 9B and FIG. 8B is that the D2D UE in FIG. 9B will calculate needed resource size on its own and one MAC CE reflecting such a resource size instead of BSR and MCS MAC CEs is reported to the eNB (as shown in step c in FIG. 9B). As the eNB does not know MCS situation of the D2D-enabled UE (D2D UE), it is not necessary for the eNB to indicate MCS, as shown in step d in FIG. 9B.

In the above, several specific examples of the resource allocation procedure in D2D communications according to embodiments of the present disclosure are described in detail. However, it is noted that these examples are only used for the purpose of illustration, but by no means to limit the scope of the present disclosure.

Figure 10:
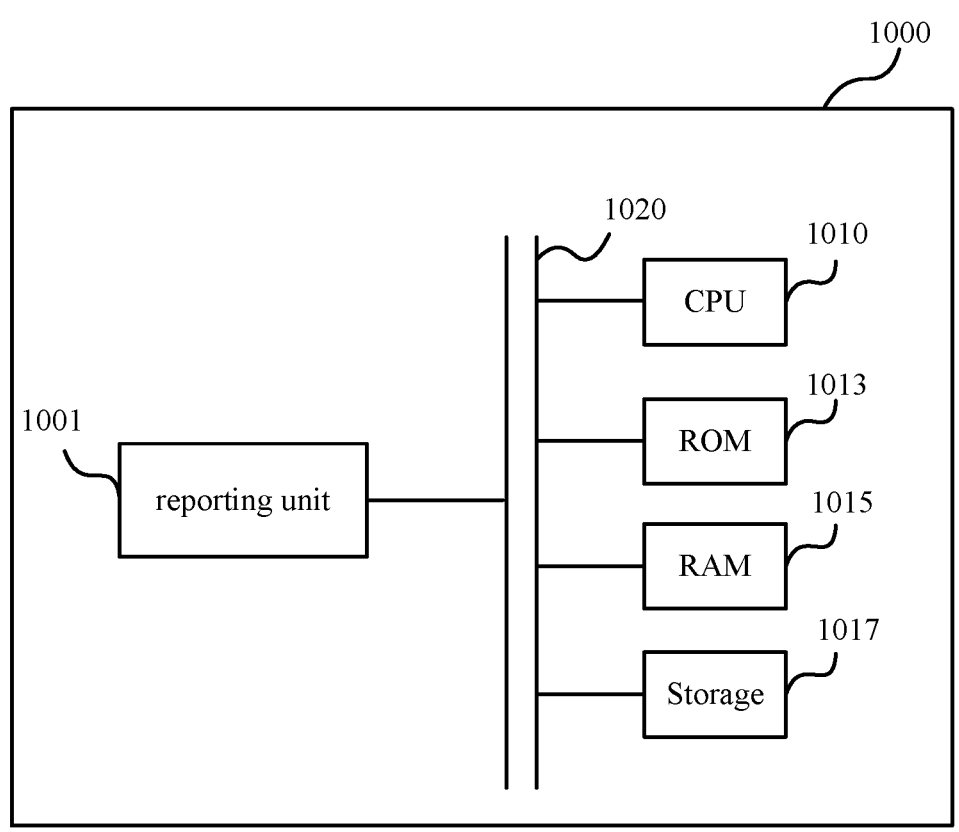
FIG. 10 is a block diagram illustrating a D2D-enabled wireless device according to an embodiment of the present disclosure.

In the present disclosure, a device-to-device (D2D)-enabled wireless device (e.g. a D2D-enabled UE) is provided. FIG. 10 is a block diagram illustrating a D2D-enabled wireless device 1000 according to an embodiment of the present disclosure. The D2D-enabled wireless device 1000 comprises a reporting unit (transmitter) 1001 configured to report (transmit), through a media access control (MAC) signaling or a radio resource control (RRC) signaling to an eNode B (eNB) that allocates resource for a D2D transmission, a recommended modulation and coding scheme (MCS) or a recommended resource size to be used by the D2D-enabled wireless device in the D2D transmission, wherein the recommended MCS or the recommended resource size is for a D2D data channel, a D2D control channel and/or a D2D discovery channel. The D2D-enabled wireless device 1000 may further comprise a receiving unit (receiver) configured to receive, from the eNB, information on the allocated resource.

The D2D-enabled wireless device 1000 according to the present disclosure may optionally include a CPU (Central Processing Unit) 1010 for executing related programs to process various data and control operations of respective units in the wireless device 1000, a ROM (Read Only Memory) 1013 for storing various programs required for performing various process and control by the CPU 1010, a RAM (Random Access Memory) 1015 for storing intermediate data temporarily produced in the procedure of process and control by the CPU 1010, and/or a storage unit 1017 for storing various programs, data and so on. The above reporting unit 1001, CPU 1010, ROM 1013, RAM 1015 and/or storage unit 1017 etc. may be interconnected via data and/or command bus 1020 and transfer signals between one another.

Respective units as described above do not limit the scope of the present disclosure. According to one implementation of the disclosure, the functions of the above reporting unit 1001 may be implemented by hardware, and the above CPU 1010, ROM 1013, RAM 1015 and/or storage unit 1017 may not be necessary. Alternatively, the functions of the above reporting unit 1001 may also be implemented by functional software in combination with the above CPU 1010, ROM 1013, RAM 1015 and/or storage unit 1017 etc.

Figure 11:
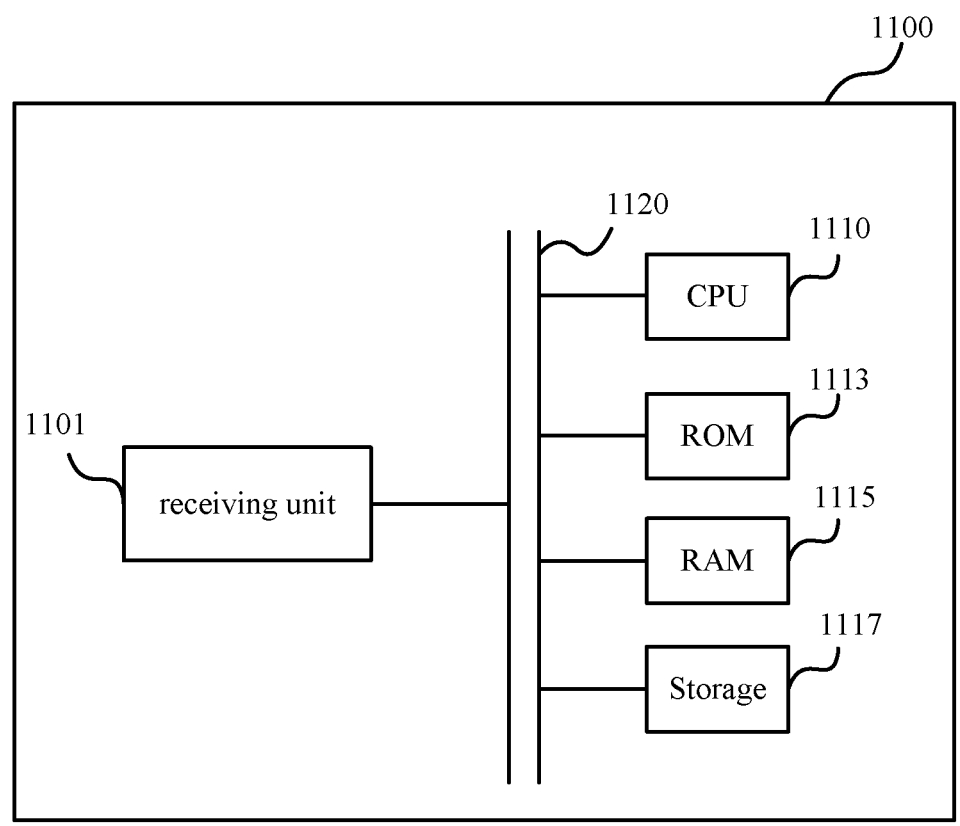
FIG. 11 is a block diagram illustrating an eNB according to an embodiment of the present disclosure.

In addition, in the present disclosure, an eNB for performing the above method is also provided. FIG. 11 is a block diagram illustrating an eNB 1100 for allocating (scheduling) resource for a D2D transmission to be performed by a D2D-enabled wireless device. The eNB 1100 comprises a receiving unit (receiver) 1101 configured to receive, from the D2D-enabled wireless device through a media access control (MAC) signaling or a radio resource control (RRC) signaling, a recommended modulation and coding scheme (MCS) or a recommended resource size to be used by the D2D-enabled wireless device in the D2D transmission, wherein the recommended MCS or the recommended resource size is for a D2D data channel, a D2D control channel and/or a D2D discovery channel. The eNB 1100 may further comprise a transmitting unit (transmitter) configured to transmit, to the D2D-enabled wireless device, information on the allocated resource.

The eNB 1100 according to the present disclosure may optionally include a CPU (Central Processing Unit) 1110 for executing related programs to process various data and control operations of respective units in the eNB 1100, a ROM (Read Only Memory) 1113 for storing various programs required for performing various process and control by the CPU 1110, a RAM (Random Access Memory) 1115 for storing intermediate data temporarily produced in the procedure of process and control by the CPU 1110, and/or a storage unit 1117 for storing various programs, data and so on. The above receiving unit 1101, CPU 1110, ROM 1113, RAM 1115 and/or storage unit 1117 etc. may be interconnected via data and/or command bus 1120 and transfer signals between one another.

Respective units as described above do not limit the scope of the present disclosure. According to one implementation of the disclosure, the functions of the above receiving unit 1101 may be implemented by hardware, and the above CPU 1110, ROM 1113, RAM 1115 and/or storage unit 1117 may not be necessary. Alternatively, the functions of the above receiving unit 1101 may also be implemented by functional software in combination with the above CPU 1110, ROM 1113, RAM 1115 and/or storage unit 1117 etc.

It is noted that the above descriptions for the methods also apply to the devices, and thus the details are omitted here.

The present disclosure can be realized by software, hardware, or software in cooperation with hardware. Each functional block used in the description of each embodiment described above can be realized by an LSI as an integrated circuit. They may be individually formed as chips, or one chip may be formed so as to include a part or all of the functional blocks. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used. Further, the calculation of each functional block can be performed by using calculating means, for example, including a DSP or a CPU, and the processing step of each function may be recorded on a recording medium as a program for execution. Furthermore, when a technology for implementing an integrated circuit that substitutes the LSI appears in accordance with the advancement of the semiconductor technology or other derivative technologies, it is apparent that the functional block may be integrated by using such technologies.

It is noted that the present disclosure intends to be variously changed or modified by those skilled in the art based on the description presented in the specification and known technologies without departing from the content and the scope of the present disclosure, and such changes and applications fall within the scope that claimed to be protected. Furthermore, in a range not departing from the content of the disclosure, the constituent elements of the above-described embodiments may be arbitrarily combined.

What is claimed is:

1. A device-to-device (D2D) communication method performed by a D2D-enabled device, comprising:
   reporting, through a media access control (MAC) signaling to an eNode B (eNB) that allocates a resource for a D2D transmission, a first modulation and coding scheme (MCS) or a first resource size for a first channel to be used by the D2D-enabled device in the D2D transmission;
   reporting, through a radio resource control (RRC) signaling to the eNB, a second MCS or a second resource size for a second channel to be used by the D2D-enabled device in the D2D transmission; and
   receiving, from the eNB, information about the allocated resource,
   wherein each of the first channel and the second channel is a D2D data channel, a D2D control channel or a D2D discovery channel.

2. The D2D communication method according to claim 1, wherein when reporting the first MCS or the second MCS, a buffer status report (BSR) is also reported from the D2D-enabled device to the eNB.

3. The D2D communication method according to claim 2, wherein the first MCS is reported in a same MAC control element (CE) with the BSR or in a different MAC CE from the BSR.

4. The D2D communication method according to claim 2, wherein a triggering of the reporting of the first MCS or the second MCS is the same as a triggering of the reporting of the BSR.

5. The D2D communication method according to claim 1, wherein when reporting the first resource size or the second resource size, no buffer status report (BSR) is reported from the D2D-enabled device to the eNB.

6. The D2D communication method according to claim 1, wherein the reporting of the first MCS or the second MCS is triggered by change in channel condition.

7. The D2D communication method according to claim 1, wherein the first MCS or the first resource size for different application scenarios for the first channel are reported in separate MAC CEs, or in a same MAC CE, wherein the different application scenarios include a public safety scenario and a commercial scenario.

8. A device-to-device (D2D) communication method performed by an eNode B (eNB) that allocates a resource for a D2D transmission to be performed by a D2D-enabled device, comprising:
   receiving, from the D2D-enabled device through a media access control (MAC) signaling, a first modulation and coding scheme (MCS) or a first resource size for a first channel to be used by the D2D-enabled device in the D2D transmission;
   receiving, from the D2D-enabled device through a radio resource control (RRC) signaling, a second MCS or a second resource size for a second channel to be used by the D2D-enabled device in the D2D transmission; and
   transmitting, to the D2D-enabled device, information about the allocated resource,
   wherein each of the first channel and the second channel is a D2D data channel, a D2D control channel or a D2D discovery channel.

9. A device-to-device (D2D)-enabled device, comprising:
   a transmitter, which, in operation, (i) transmits, through a media access control (MAC) signaling to an eNode B (eNB) that allocates a resource for a D2D transmission, a first modulation and coding scheme (MCS) or a first resource size for a first channel to be used by the D2D-enabled device in the D2D transmission, and (ii) transmits, through a radio resource control (RRC) signaling to the eNB, a second MCS or a second resource size for a second channel to be used by the D2D-enabled device in the D2D transmission; and a receiver, which, in operation, receives, from the eNB, information about the allocated resource, wherein each of the first channel and the second channel is a D2D data channel, a D2D control channel or a D2D discovery channel.

10. The D2D-enabled device according to claim 9, wherein when reporting the first MCS or the second MCS, a buffer status report (BSR) is also reported from the D2D-enabled device to the eNB.

11. The D2D-enabled device according to claim 10, wherein the first MCS is reported in a same MAC control element (CE) with the BSR or in a different MAC CE from the BSR.

12. The D2D-enabled device according to claim 10, wherein a triggering of the reporting of the first MCS or the second MCS is the same as a triggering of the reporting of the BSR.

13. The D2D-enabled device according to claim 9, wherein when reporting the first resource size or the second resource size, no buffer status report (BSR) is reported from the D2D-enabled device to the eNB.

14. The D2D-enabled device according to claim 9, wherein the reporting of the first MCS or the second MCS is triggered by change in channel condition.

15. An eNode B (eNB) that allocates a resource for a device-to-device (D2D) transmission to be performed by a D2D-enabled device, comprising:

a receiver, which, in operation, (i) receives, from the D2D-enabled device through a media access control (MAC) signaling, a first modulation and coding scheme (MCS) or a first resource size for a first channel to be used by the D2D-enabled device in the D2D transmission, and (ii) receives, from the D2D-enabled device through a radio resource control (RRC) signaling, a second MCS or a second resource size for a second channel to be used by the D2D-enabled device in the D2D transmission; and a transmitter, which, in operation, transmits, to the D2D-enabled device, information about the allocated resource, wherein each of the first channel and the second channel is a D2D data channel, a D2D control channel or a D2D discovery channel.

* * * * *